United States Patent
Hirano et al.

(10) Patent No.: US 11,533,627 B2
(45) Date of Patent: Dec. 20, 2022

(54) MANAGEMENT DEVICE FOR MANAGING A RADIO ACCESS NETWORK

(71) Applicant: Mitsubishi Electric Corporation, Tokyo (JP)

(72) Inventors: Yukio Hirano, Tokyo (JP); Kenichi Nakura, Tokyo (JP); Akiko Nagasawa, Tokyo (JP); Takeshi Suehiro, Tokyo (JP); Fumihiko Tano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 74 days.

(21) Appl. No.: 17/100,459

(22) Filed: Nov. 20, 2020

(65) Prior Publication Data

US 2021/0076220 A1 Mar. 11, 2021

Related U.S. Application Data

(63) Continuation of application No. PCT/JP2018/020349, filed on May 28, 2018.

(51) Int. Cl.
*H04W 16/02* (2009.01)
*H04W 88/08* (2009.01)

(52) U.S. Cl.
CPC ............ *H04W 16/02* (2013.01); *H04W 88/08* (2013.01)

(58) Field of Classification Search
None
See application file for complete search history.

(56) References Cited

U.S. PATENT DOCUMENTS 10,264,461 B2 4/2019 Aijaz
10,405,239 B2 9/2019 Oohira et al.
(Continued)

FOREIGN PATENT DOCUMENTS

JP 2014-165614 A 9/2014
JP 2017-200172 A 11/2017
(Continued)

OTHER PUBLICATIONS

"3rd Generation Partnership Project; Technical Specification Group Radio Access Network; Study on new radio access technology: Radio access architecture and interfaces (Release 14)", 3GPP TR 38.801 V14.0.0 (Mar. 2017), Mar. 2017, pp. 1-91.
(Continued)

*Primary Examiner* — Jamaal Henson
(74) *Attorney, Agent, or Firm* — Birch, Stewart, Kolasch & Birch, LLP

(57) ABSTRACT

A management device for managing a radio access network includes: a RAN slice management unit configured to manage a slice of the radio access network; a radio resource management unit configured to abstract and manage a radio resource possessed by a radio base station included in a radio network; an optical resource management unit configured to abstract and manage an optical resource possessed by an optical communication device included in an optical network; and a base station resource management unit configured to abstract and manage a base station resource possessed by a base station device included in a base station network. When a slice generation request is received from a higher-level management device, the RAN slice management unit determines an abstracted radio resource, an abstracted optical resource and an abstracted base station resource to be assigned to a slice, based on requested performance of the slice.

5 Claims, 13 Drawing Sheets

(56) References Cited

U.S. PATENT DOCUMENTS

| | | | |
|---|---|---|---|
| 2018/0123878 A1* | 5/2018 | Li | H04L 41/122 |
| 2018/0191563 A1* | 7/2018 | Farmanbar | H04W 48/18 |
| 2019/0037409 A1* | 1/2019 | Wang | H04W 88/14 |
| 2019/0075578 A1* | 3/2019 | Kim | H04W 28/0236 |
| 2019/0223023 A1* | 7/2019 | Altay | H04L 41/5051 |

FOREIGN PATENT DOCUMENTS

| | | | | |
|---|---|---|---|---|
| WO | WO 2017/163735 A1 | 9/2017 | | |
| WO | WO-2019170245 A1 * | 9/2019 | | H04L 41/042 |

OTHER PUBLICATIONS

CATT, "Consideration on RAN slicing support", R2-1700225, 3GPP TSG RAN WG2 Meeting Ad Hoc Spokane, USA, Jan. 17-19, 2017, pp. 1-5.

Huawei Technologies, "Vision on 5G Radio Access Technologies", RWS-150006, 3GPP RAN workshop on 5G, Phoenix, USA, Sep. 17-18, 2015, pp. 1-18.

Qualcomm Technologies, Inc., "Making 5G NR a reality: Leading the technology innovations for a unified, more capable 5G air interface", Sep. 2016, pp. 1-65.

Türk Telekom, "Network Slicing Solution with RAN Slicing", SP-160534, TSG SA Meeting #SP-73, New Orleans, USA, Sep. 21-23, 2016, pp. 1-9.

* cited by examiner

FIG. 5

| SLICE NAME | ACCEPTABLE DELAY | GUARANTEED RATE | PEAK RATE | SERVER FUNCTION | SITE |
|---|---|---|---|---|---|
| SLICE 1 | 10ms | 1Mbps | 5Mbps | VIRTUAL 5G CORE | ALL SITES |
| SLICE 2 | 500ms | NO REQUEST | 400Mbps | TERMINAL AUTHENTICATION | SITE1 |

FIG. 9

MANAGEMENT DEVICE FOR MANAGING A RADIO ACCESS NETWORK

CROSS REFERENCE TO RELATED APPLICATIONS

This application is a Continuation of PCT International Application No. PCT/JP2018/020349, filed on May 28, 2018, which is hereby expressly incorporated by reference into the present application.

TECHNICAL FIELD

The present invention relates to a device configured to assign and manage resources in a radio access network (RAN).

BACKGROUND ART

In the 5th generation mobile communication network (5G), it is planned to implement a network slicing for virtually dividing the network. For each slice, various services having different requirements for communication are assigned (see, for example, Patent Literature 1, Non Patent Literature 1 and Non Patent Literature 2).

In Non Patent Literature 1, there is described an example of 5G radio resources to be assigned to different services and a plurality of radio access technologies (RATs) for implementing those 5G radio resources.

In Non Patent Literature 2, there is described an example of a method of assigning and managing 5G radio resources similar to those described in Non Patent Literature 1. Specifically, in Non Patent Literature 2, a plurality of radio resources are divided into a plurality of RAN slices, and each RAN slice is to be assigned to a different service.

In Patent Literature 1, there is described in detail an example of a specific method of assigning radio resources.

CITATION LIST

Patent Literature

[PTL 1] WO 2017/163735 A1

Non Patent Literature

[NPL 1] Making 5G NR a reality, Qualcomm Technologies, Sept. 2016
[NPL 2] Vision on 5G Radio Access Technologies, Huawei Technologies, 3GPP RAN workshop, Sept. 2015, RWS-150006

SUMMARY OF INVENTION

Technical Problem

In the above-mentioned related-art literatures, various considerations are given to the method of assigning and managing the radio resources. However, in those literatures, there is no description of an efficient assignment and management method in a network environment including other communication resources, such as an optical resource and a base station resource.

An object of the present invention is to provide a management device for managing a radio access network, which can efficiently assign and manage various types of communication resources included in the radio access network.

Solution to Problem

In order to solve the above-mentioned problem, according to one embodiment of the present invention, there is provided a management device for managing a radio access network including a radio network, an optical network and a base station network. The management device comprises: a RAN slice management unit configured to manage a slice of the radio access network; a radio resource management unit configured to abstract and manage a radio resource possessed by a radio base station included in the radio network; an optical resource management unit configured to abstract and manage an optical resource possessed by an optical communication device included in the optical network; and a base station resource management unit configured to abstract and manage a base station resource possessed by a base station device included in the base station network. When a slice generation request is received from a higher-level management device, the RAN slice management unit determines an abstracted radio resource, an abstracted optical resource and an abstracted base station resource to be assigned to a slice, based on requested performance of the slice, and the radio resource management unit notifies radio resource information to the optical resource management unit and the base station resource management unit.

Advantageous Effects of Invention

According to the management device of the present invention, various types of communication resources included in the radio access network can be efficiently assigned and managed.

BRIEF DESCRIPTION OF DRAWINGS

FIG. 5 shows an example of request conditions of the slice generation in the first embodiment of the present invention.
FIG. 9 illustrates an example of a reserved base station resource and an actually used base station resource in the first embodiment of the present invention.

DESCRIPTION OF EMBODIMENTS

Now, with reference to the accompanying drawings, detailed descriptions are made of embodiments of the present invention. The embodiments described below are one example, and the present invention is not limited to those embodiments.

First Embodiment

Figure 1:
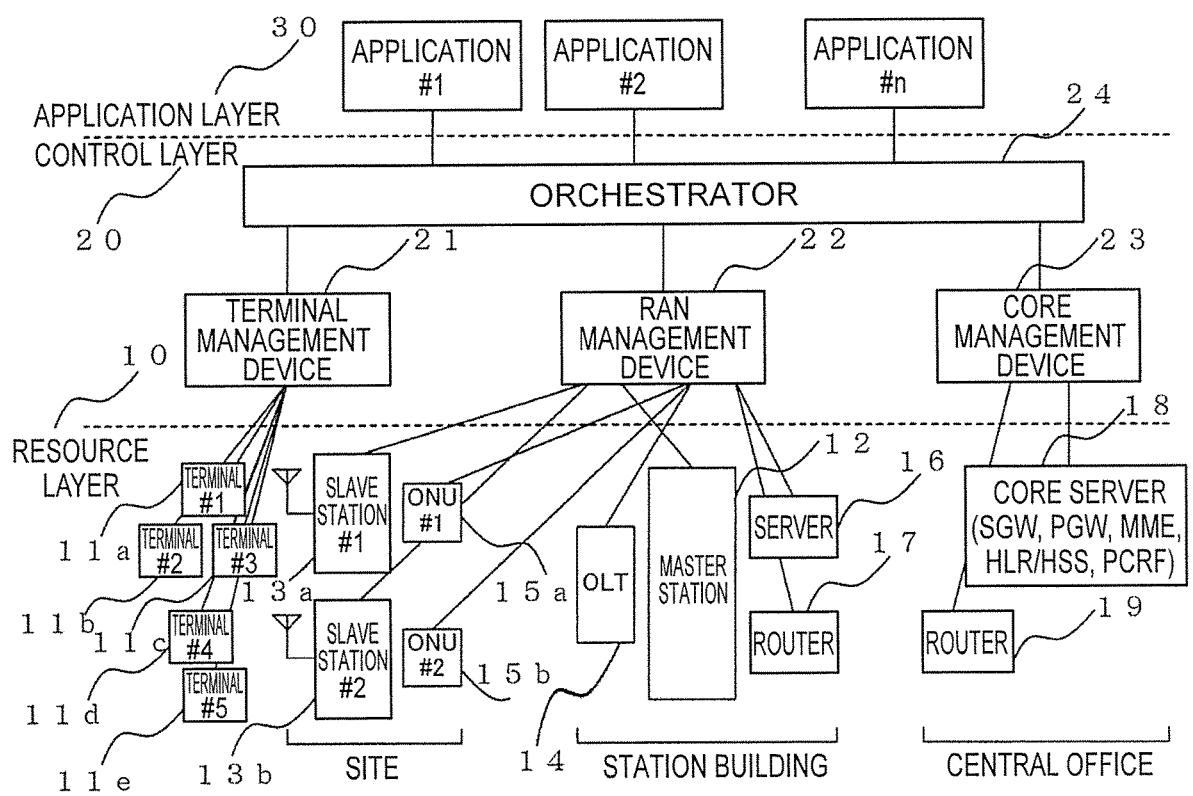
FIG. 1 is a diagram of a communication system according to a first embodiment of the present invention.

FIG. 1 is a diagram of a communication system according to a first embodiment of the present invention. The communication system includes a resource layer 10, a control layer 20 and an application layer 30.

The resource layer 10 includes various physical or virtual devices. The control layer 20 includes a terminal management device 21 configured to manage various wireless terminals, a radio access network (RAN) management device 22 configured to manage a RAN, a core management device 23 configured to manage a core network and an orchestrator 24 configured to integrally manage those devices.

The terminal management device 21 is configured to manage wireless terminals 11a to 11e. The RAN management device 22 is configured to manage a master station 12 and slave stations 13a and 13b which are radio base stations. The RAN management device 22 is also configured to manage an OLT 14 and ONUs 15a and 15b which are optical communication devices. The RAN management device 22 is also configured to manage a server 16 and a router 17 which are base station devices. The core management device 23 is configured to manages a core server 18 and a router 19 housed in a central office.

In FIG. 1, another network may exist in order to connect the RAN and the core network. In that case, another management device exists.

FIG. 1 shows a logical connection between the resource layer 10 and the control layer 20. Therefore, a physical network connecting those layers may be a dedicated network or a network shared with user data.

Figure 2:
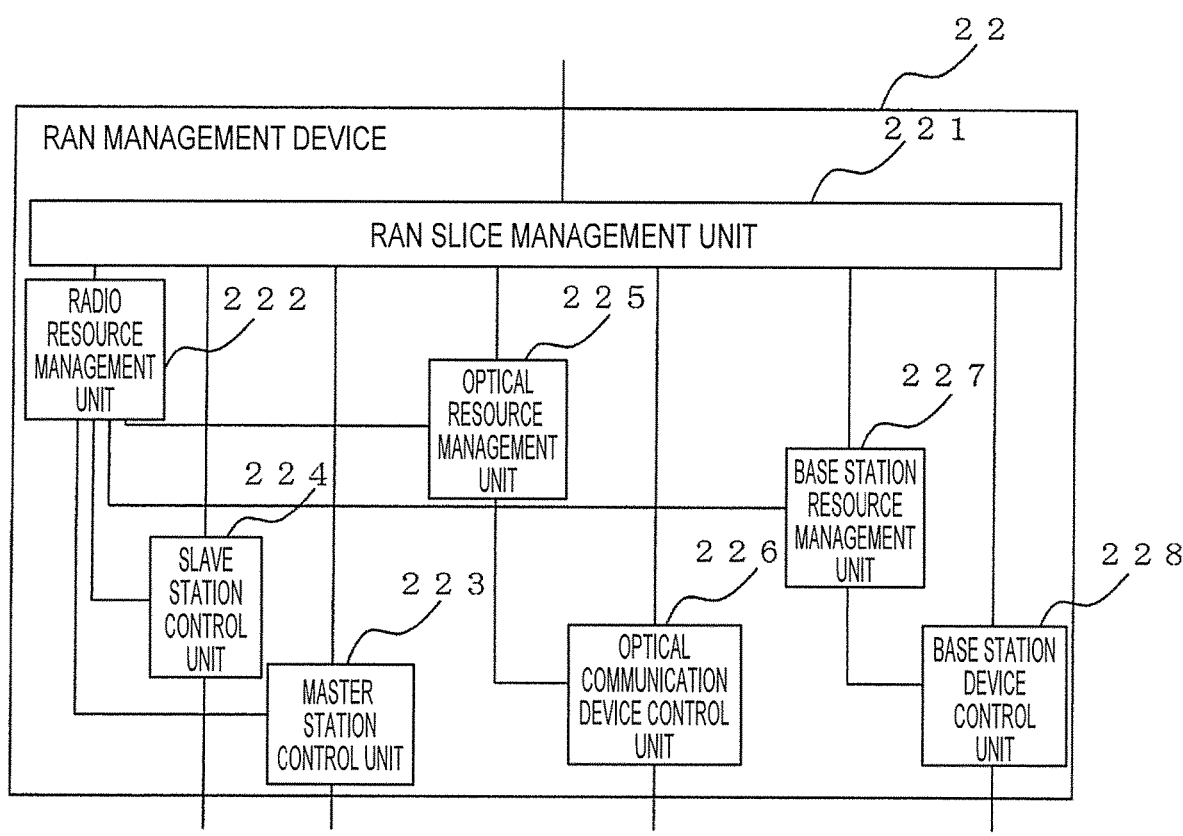
FIG. 2 is a function block diagram of a RAN management device according to the first embodiment of the present invention.

FIG. 2 is a function block diagram of the RAN management device 22. The RAN management device 22 comprises a RAN slice management unit 221, a radio resource management unit 222, a master station control unit 223, a slave station control unit 224, an optical resource management unit 225, an optical communication device control unit 226, a base station resource management unit 227 and a base station device control unit 228.

The RAN slice management unit 221 is configured to manage slices of the radio access network. When a slice generation request from the orchestrator 24, which is a higher-level management device, is received, the RAN slice management unit 221 determines a radio resource, an optical resource and a base station resource to be assigned to a slice, based on requested performance of the slice, and the RAN slice management unit 221 assigns the determined radio resource, optical resource and base station resource to the slice.

The radio resource management unit 222 is configured to manage the radio resources possessed by the master station 12 and the slave stations 13a and 13b which are radio base stations.

The master station control unit 223 is configured to control the master station 12. The slave station control unit 224 is configured to control the slave stations 13a and 13b.

The optical resource management unit 225 is configured to manage the optical resources possessed by the OLT 14 and ONUs 15a and 15b which are optical communication devices.

The optical communication device control unit 226 is configured to control the OLT 14 and the ONUs 15a and 15b.

The base station resource management unit 227 is configured to manage the base station resources possessed by the core server 18 and the router 19, which are base station devices.

(Acquisition of Available Resources)

Figure 3:
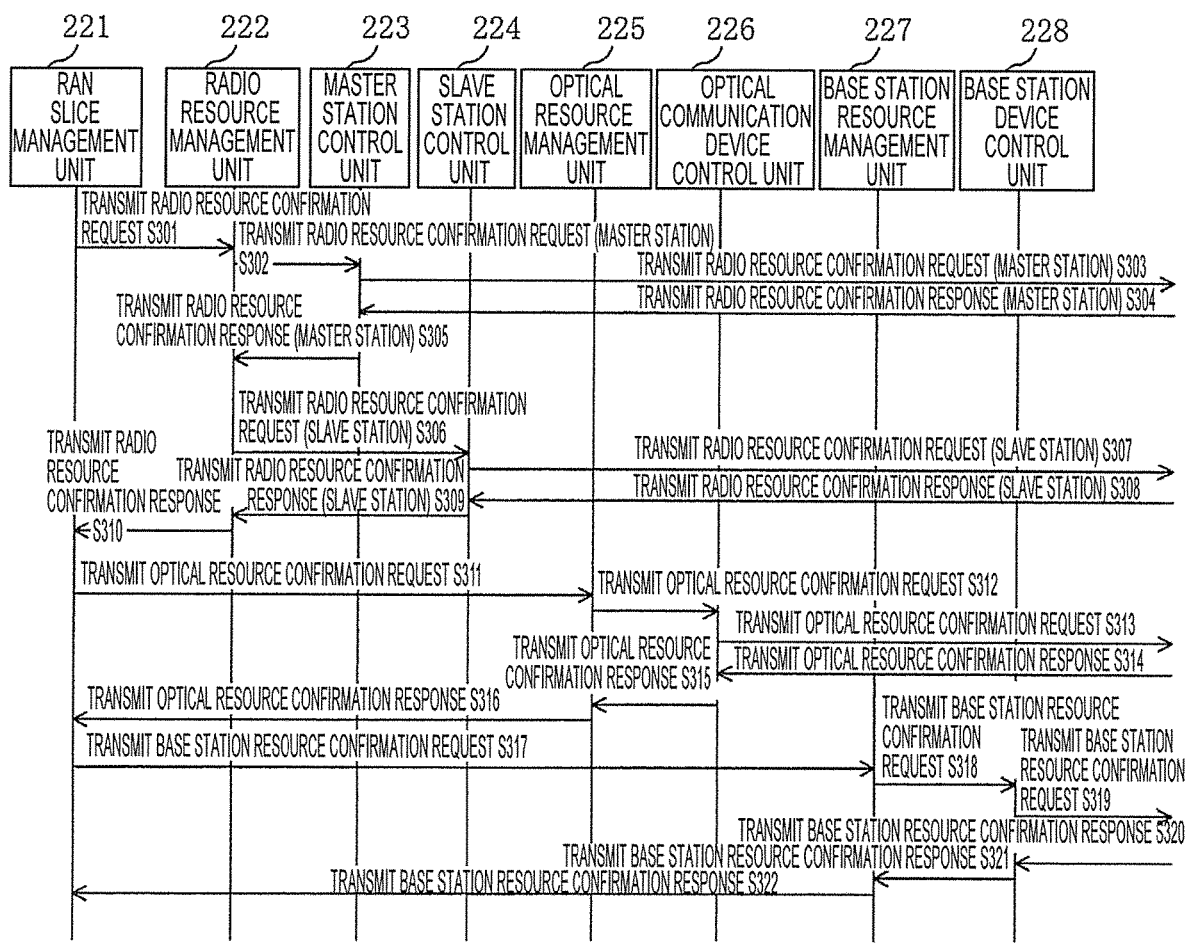
FIG. 3 is a diagram for illustrating an operation of acquiring available resources in the RAN management device according to the first embodiment of the present invention.

FIG. 3 is a diagram for illustrating an example of an operation of acquiring available resources in the RAN management device 22 according to the first embodiment of the present invention. Details of the operation of acquiring available resources in the RAN management device 22 are now described with reference to FIG. 3.

When the various devices included in the radio access network and the RAN management device 22 are activated, the RAN management device 22 confirms communication resources possessed by the various devices included in the resource layer 10, and performs the operation of acquiring available resources.

Specifically, first, the RAN slice management unit 221 transmits a radio resource confirmation request to the radio resource management unit 222 (Step S301).

The radio resource management unit 222 transmits a radio resource confirmation request to the master station control unit 223 in order to confirm available radio resources possessed by the master station 12 (Step S302).

The master station control unit 223 transmits a radio resource confirmation request to the master station 12 (Step S303).

In the present invention, the term "radio resource" is a generic term for various functions and performance possessed by the master station 12 and the slave stations 13a and 13b, as well as resource blocks (RB) of frequency bands.

For example, the radio resources include a modulation method and a coding rate of the resource blocks, a frequency band, the number of antennas, bandwidths and MIMOs for each frequency band, the number of carrier aggregations, various radio access technologies (RAT), base station functions of the master station 12 and slave stations 13a, 13b, LTE/5G functions supported by the master station 12.

When the master station control unit 223 receives a radio resource confirmation response from the master station 12 (Step S304), the master station control unit 223 acquires and holds the physical or virtual available radio resources included in the radio resource confirmation response, and transmits a response to the radio resource management unit 222 (Step S305).

Further, the radio resource management unit 222 transmits a radio resource confirmation request to the slave station control unit 224 in order to confirm available radio resources possessed by the slave stations 13*a* and 13*b* (Step S306).

The slave station control unit 224 transmits a radio resource confirmation request to the slave stations 13*a* and 13*b* (Step S307).

When the slave station control unit 224 receives radio resource confirmation responses from the slave stations 13*a* and 13*b* (Step S308), the slave station control unit 224 acquires and holds the physical or virtual available radio resources included in those radio resource confirmation responses, and transmits a response to the radio resource management unit 222 (Step S309).

When the radio resource management unit 222 receives those responses from the master station control unit 223 and the slave station control unit 224, the radio resource management unit 222 abstracts the information on the acquired available radio resources as required, and transmits a response to the RAN slice management unit 221 (Step S310).

The term "abstract" as used herein refers to converting information on the capabilities relating to physical or virtual functions and performance into unified information, such as a maximum data rate (bit/s) in place of the number of resource blocks and a delay time (ms) in place of short TTI support.

For example, when there are multiple slave stations at the same site and there are a master station and slave stations capable of simultaneously executing Split Options 2, 6, and 7-1 by a virtualization function, the abstracted radio resource information is a set including the maximum data rate, the delay time and the usable RATS grouped by the same site and the same function.

Similarly, the RAN slice management unit 221 transmits an optical resource confirmation request to the optical resource management unit 225 (Step S311).

The optical resource management unit 225 transmits an optical resource confirmation request to the optical communication device control unit 226 in order to confirm available optical resources possessed by the OLT 14 and the ONUs 15*a* and 15*b* which are the optical communication devices included in the resource layer 10 (Step S312).

The optical communication device control unit 226 transmits an optical resource confirmation request to the OLT 14 and the ONUs 15*a* and 15*b* (Step S313).

If the OLT 14 has the optical resource information on the ONUs 15*a* and 15*b* based on some kind of protocol e.g. OAM, the optical communication device control unit 226 may transmit the optical resource confirmation request to only the OLT 14.

In the present invention, the optical resources include an access method between the OLT 14 and the ONUs 15*a* and 15*b*, the access method between the OLT 14 and the router 17, the number of ports, the number of wavelengths, a link speed, a presence or absence and performance of various QoS, granularity, a delay time, and the like.

When the optical communication device control unit 226 receives the optical resource confirmation responses from the OLT 14 and the ONUs 15*a* and 15*b* (Step S314), the optical communication device control unit 226 acquires and holds the physical or virtual available optical resources included in those optical resource confirmation responses, and transmits a response to the optical resource management unit 225 (Step S315).

When the optical resource management unit 225 receives this response from the optical communication device control unit 226, the optical resource management unit 225 abstracts the information on the acquired available optical resources as required, and transmits a response to the RAN slice management unit 221 (Step S316).

When there are multiple physical or virtual devices, the abstracted optical resource information is a set including the maximum data rate, the delay time, and the usable optical access technologies grouped by the same network function.

Similarly, the RAN slice management unit 221 transmits a base station resource confirmation request to the base station resource management unit 227 (Step S317).

The base station resource management unit 227 transmits a base station resource confirmation request to the base station device control unit 228 in order to confirm available base station resources possessed by the server 16 and the router 17 which are the base station devices included in the resource layer 10 (Step S318).

The base station device control unit 228 transmits a base station resource confirmation request to the server 16 and the router 17 respectively (Step S319).

In the present invention, the base station resources include a network protocol e.g. Ethernet, the number of ports, an authentication function implemented by software on a server, the presence or absence and performance of various network functions e.g. a virtual core function, a minimum delay time, and the like.

When the base station device control unit 228 receives the base station resource confirmation responses from the server 16 and the router 17 (Step S320), the base station device control unit 228 acquires and holds the physical or virtual available base station resources included in those base station resource confirmation responses, and transmits a response to the base station resource management unit 227 (Step S321).

When the base station resource management unit 227 receives this response from the base station device control unit 228, the base station resource management unit 227 abstracts the information on the acquired available base station resources as required, and transmits a response to the RAN slice management unit 221 (Step S322). Description of the case in which there are multiple physical or virtual devices is the same as that given above.

Through these operations described above, the RAN management device 22 can acquire and hold the available communication resources possessed by the various devices included in the resource layer 10.

In addition to starting these operations when the RAN management device 22 is activated, these operations may also be started based on an instruction from the orchestrator 24. These operations may also be started based on a resource change notification from a communication device included in the resource layer 10.

(Slice Generation)

Next, a slice generating operation in the RAN management device 22 according to the first embodiment of the present invention is described with reference to FIG. 4 to FIG. 6.

Figure 4:
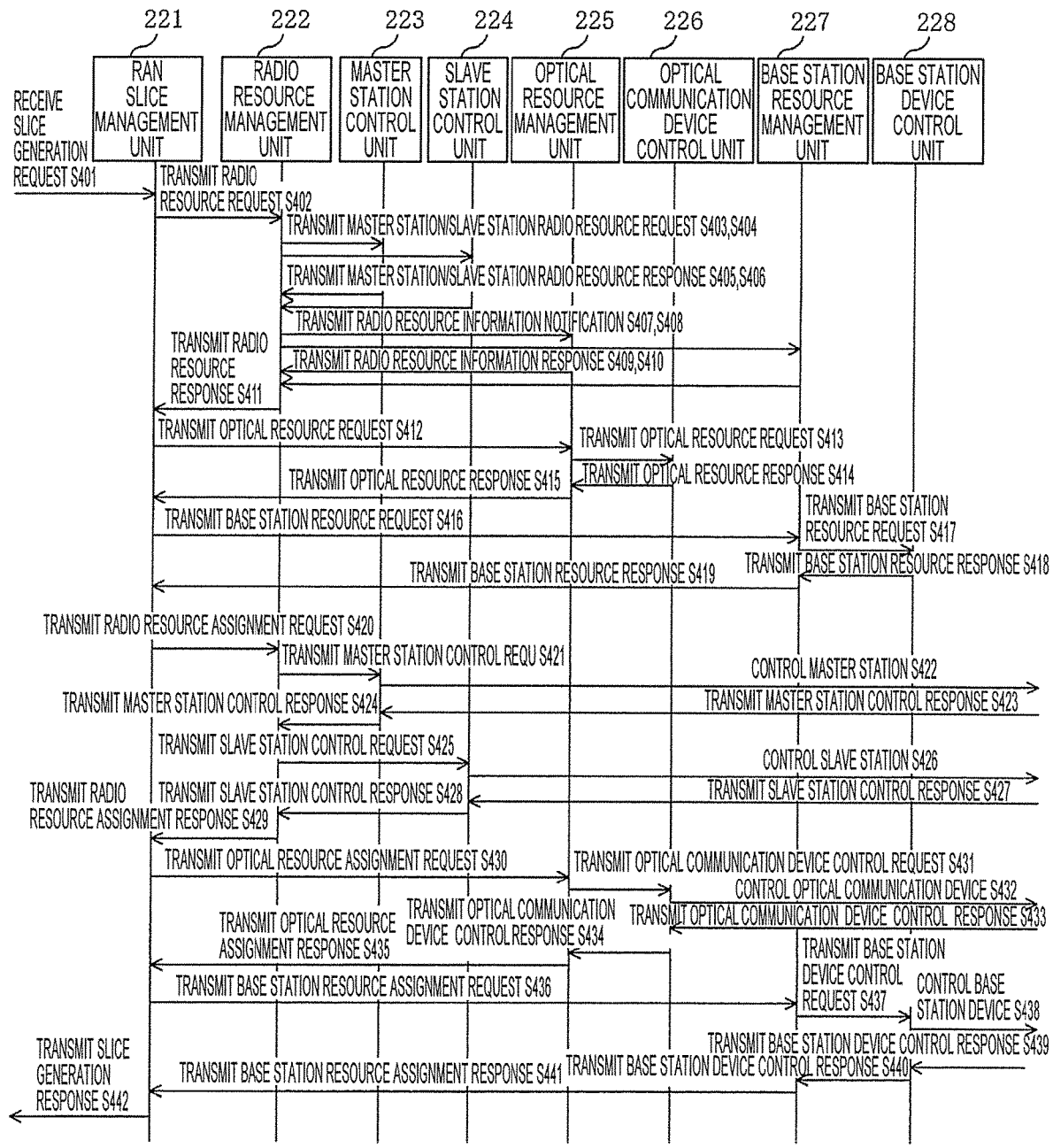
FIG. 4 illustrates a slice generating operation in the RAN management device according to the first embodiment of the present invention.

FIG. 4 illustrates an example of the slice generating operation in the RAN management device 22.

FIG. 5 shows an example of request conditions of the slice generation. For example, Slice 1 is a request that the guaranteed rate of terminals is 1 Mbps at all sites, and is aimed to reduce a delay by requesting a virtual core function of the server 16.

Figure 6:
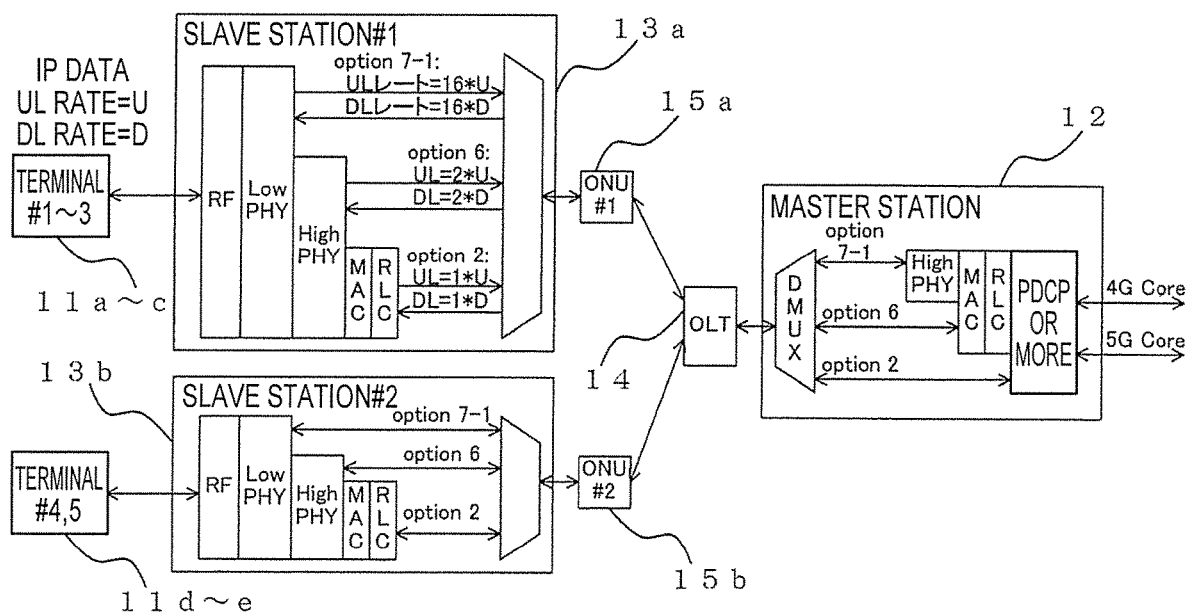
FIG. 6 illustrates an example of functional split in a master station and a slave station in the first embodiment of the present invention.

FIG. 6 illustrates an example of functional split in the master station 12 and the slave stations 13*a* and 13*b*.

(Generation of Slice 1)

Details of an operation for generating Slice 1 in the RAN management device 22 are now described with reference to FIG. 4.

First, the RAN slice management unit 221 receives from the orchestrator 24 a request to generate Slice 1 (Step S401).

The RAN slice management unit 221 determines whether there is an available resource satisfying the requested performance, based on the abstracted information on the available resources acquired in advance.

For example, when the requested performance is an acceptable delay, the determination can be performed based on whether the total of the delay time of the radio resource (e.g. 3 ms), the delay time of the optical resource (e.g. 1 ms) and the delay time of the base station resource (e.g. 4 ms) is within the requested acceptable delay range.

As another example, when the requested performance is a guaranteed rate, the determination can be performed based on whether the minimum value of the maximum data rate of the radio resource, the optical resource and the base station resource is more than or equal to the requested guaranteed rate.

When the RAN slice management unit 221 determines that the requested performance of Slice 1 is satisfied, the RAN slice management unit 221 transmits a radio resource request (Slice 1) to the radio resource management unit 222 (Step S402).

At this time, the requested guaranteed rate, peak rate and site are identical with those of the requests from the orchestrator 24. The requested delay time is the delay time of the radio resource for which the total of the above-mentioned delay times is less than or equal to 10 ms. For example, this requested delay time may be 3 ms which is identical with the capability, or may be 3.7 ms which is determined from the ratio 1.25 (the ratio between the total value of the capability and the requested condition).

The radio resource management unit 222 determines an assignable radio resource based on the radio resource request (Slice 1).

In this case, the requested peak rate is small and the requested delay time is short. Therefore, the slave stations 13a and 13b are respectively to be assigned a resource supporting Split Option 2 and a short TTI and guaranteeing 1 Mbps in terms of IP data at both the Site 1 and the Site 2. Moreover, the master station 12 is to be assigned a 5G function.

If available radio resources satisfying those requests remain and it is determined that the requested performance is satisfied, the radio resource management unit 222 transmits physical or virtual radio resource requests (Slice 1) to the master station control unit 223 and the slave station control unit 224 (Step S403 and Step S404).

The master station control unit 223 and the slave station control unit 224 respectively reserve, based on the radio resource request (Slice 1), a radio resource satisfying the request from their available radio resources.

The master station control unit 223 and the slave station control unit 224 respectively transmit a radio resource response (Slice 1) to the radio resource management unit 222 (Step S405 and Step S406). These radio resource responses (Slice 1) include information on the available radio resources which have decreased due to the reservation.

When the radio resource management unit 222 receives these information, the radio resource management unit 222 transmits to the optical resource management unit 225 a radio resource information notification (Slice 1). This radio resource information notification (Slice 1) includes information on the presence or absence and the amount of optical resources, e.g. functional split (Split Option 2) in the master station 12 and the slave stations 13a and 13b (Step S407).

Further, the radio resource management unit 222 transmits to the base station resource management unit 227 a radio resource information notification (Slice 1). This radio resource information notification (Slice 1) includes information on the presence or absence and the amount of base station resources, e.g. whether the master station 12 uses an interface with the 5G core (Step S408).

When the radio resource information notification (Slice 1) is received from the radio resource management unit 222, the optical resource management unit 225 and the base station resource management unit 227 respectively transmit back a radio resource information response (Slice 1) (Step S409 and Step S410).

When the radio resource management unit 222 receives those responses, the radio resource management unit 222 transmits back to the RAN slice management unit 221 a radio resource response (Slice 1). This radio resource response (Slice 1) includes abstracted information on the available radio resources which have decreased due to the reservation (Step S411).

Similarly, the RAN slice management unit 221 transmits an optical resource request (Slice 1) to the optical resource management unit 225 (Step S412).

The optical resource management unit 225 assigns a resource having a bandwidth-guaranteed QoS function, and particularly for an uplink, a bandwidth-guaranteed uplink ONU transmission permission function, because the requested delay time is short and there is a requirement of the guaranteed rate.

As a result of the radio resource information notification (Slice 1), in consideration of the fact that Split Option is 2, the optical resource management unit 225 determines that the requests for an optical resource of both the Site 1 and the Site 2 are for 1 Mbps, which is equal to the guaranteed rate of 1 Mbps in terms of IP data.

Further, the optical resource management unit 225 assigns an optical resource having a policing function of 5 Mbps in total for the Site 1 and the Site 2 for a peak rate monitoring.

The optical resource management unit 225 transmits a physical or virtual optical resource request (Slice 1) to the optical communication device control unit 226 (Step S413).

For example, the requested delay time maybe 2 ms which is identical with the capability, or may be 1.25 which is determined from the ratio 1.25 (the ration between the total value of the capability and the requested condition).

The optical communication device control unit 226 reserves, based on the optical resource request, an optical resource satisfying the request from its available optical resources.

The optical communication device control unit 226 transmits back to the optical resource management unit 225 an optical resource response (Slice 1). This optical resource response (Slice 1) includes information on the available optical resources which have decreased due to the reservation (Step S414).

When the optical resource management unit 225 receives those responses, the optical resource management unit 225 transmits back to the RAN slice management unit 221 an optical resource response (Slice 1). This optical resource response (Slice 1) includes the abstracted information on the available optical resources which have decreased due to the reservation (Step S415).

Similarly, the RAN slice management unit 221 transmits a base station resource request (Slice 1) to the base station resource management unit 227 (Step S416).

The base station resource management unit 227 assigns a base station resource with a virtual 5G core function having a data processing capability of at least 1 Mbps to the server 16. This is because the requested delay time is short, there are requirements of the peak rate and the guaranteed rate, and the master station 12 is an interface with the 5G core due to the above-mentioned radio resource information notification (Slice 1).

The base station resource management unit 227 assigns to the router 17 a base station resource for performing a 5 Mbps policing function and a 5G core interface bandwidth guarantee between the server 16 and the master station 12.

The base station resource management unit 227 transmits a physical or virtual base station resource request (Slice 1) to the base station device control unit 228 (Step S417).

For example, the requested delay time maybe 5 ms which is obtained by subtracting 3 ms of the radio resource delay time request and 2 ms of the optical resource delay time request from the requested condition, or may be 5 ms which is determined from the ratio 1.25 (the ratio between the total value of the capability and the requested condition).

The base station device control unit 228 reserves, based on the base station resource request, a base station resource satisfying the request from its available base station resources.

The base station device control unit 228 transmits back to the base station resource management unit 227 a base station resource response (Slice 1). This base station resource response (Slice 1) includes information on the available base station resources which have decreased due to the reservation (Step S418).

When the base station resource management unit 227 receives this response, the base station resource management unit 227 transmits to the RAN slice management unit 221 a base station resource response (Slice 1). This base station resource response (Slice 1) includes abstracted information on the available base station resources which have decreased due to the reservation (Step S419).

When the RAN slice management unit 221 receives those responses, the RAN slice management unit 221 determines that a resource can be assigned to Slice 1.

The RAN slice management unit 221 transmits a radio resource assignment request (Slice 1) to the radio resource management unit 222 in order to actually assign the various reserved resources to the various devices included in the resource layer 10 (Step S420).

When the radio resource management unit 222 receives the radio resource assignment request, the radio resource management unit 222 transmits a master station control request (Slice 1) to the master station control unit 223 (Step S421).

The master station control unit 223 transmits a master station control command for assigning the reserved physical or virtual radio resource to Slice 1 (Step S422).

When the master station control unit 223 receives a master station control response from the master station 12 included in the resource layer 10 (Step S423), the master station control unit 223 transmits a master station control response (Slice 1) to the radio resource management unit 222 (Step S424).

Further, the radio resource management unit 222 transmits a slave station control request (Slice 1) to the slave station control unit 224 (Step S425).

The slave station control unit 224 transmits slave station control commands for assigning the reserved physical or virtual radio resources to Slice 1 (Step S426).

When the slave station control unit 224 receives slave station control responses from the slave stations 13a and 13b included in the resource layer 10 (Step S427), the slave station control unit 224 transmits a slave station control response (Slice 1) to the radio resource management unit 222 (Step S428).

When the radio resource management unit 222 receives those responses, the radio resource management unit 222 transmits a radio resource assignment response (Slice 1) to the RAN slice management unit 221 (Step S429).

Similarly, the RAN slice management unit 221 transmits an optical resource assignment request (Slice 1) to the optical resource management unit 225 (Step S430).

When the optical resource management unit 225 receives this request, the optical resource management unit 225 transmits an optical communication device control request (Slice 1) to the optical communication device control unit 226 (Step S431).

The optical communication device control unit 226 transmits optical communication device control commands for assigning the reserved physical or virtual optical resources to Slice 1 (Step S432).

When the optical communication device control unit 226 receives responses from the OLT 14 and the ONUs 15a and 15b included in the resource layer 10 (Step S433), the optical communication device control unit 226 transmits an optical communication device control response (Slice 1) to the optical resource management unit 225 (Step S434).

When the optical resource management unit 225 receives this response, the optical resource management unit 225 transmits an optical resource assignment response (Slice 1) to the RAN slice management unit 221 (Step S435).

Similarly, the RAN slice management unit 221 transmits a base station resource assignment request (Slice 1) to the base station resource management unit 227 (Step S436).

When the base station resource management unit 227 receives this request, the base station resource management unit 227 transmits a base station device control request (Slice 1) to the base station device control unit 228 (Step S437).

The base station device control unit 228 transmits base station device control commands such that the reserved physical or virtual base station resources are to be assigned to Slice 1 (Step S438).

When the base station device control unit 228 receives responses from the server 16 and the router 17 included in the resource layer 10 (Step S439), the base station device control unit 228 transmits a base station device control response (Slice 1) to the base station resource management unit 227 (Step S440).

When the base station resource management unit 227 receives this response, the base station resource management unit 227 transmits a base station resource assignment response (Slice 1) to the RAN slice management unit 221 (Step S441).

When the RAN slice management unit 221 receives this response, the RAN slice management unit 221 notifies the orchestrator 24 that the resources have been assigned to Slice 1 (Step S442).

(Generation of Slice 2)

Similarly, an operation for generating Slice 2 in the RAN management device 22 according to the first embodiment of the present invention is now described.

As shown in FIG. 5, Slice 2 is a request for a peak rate of the terminal connected at the Site 1 to be 400 Mbps, and is also a request for a terminal authentication function to the server 16.

Details of an operation for generating Slice 2 in the RAN management device 22 are now described with reference to FIG. 4.

First, the RAN slice management unit 221 receives from the orchestrator 24 a request to generate Slice 2 (Step S401).

The RAN slice management unit 221 determines whether there is an available resource satisfying the requested performance, based on the abstracted information on the available resources obtained at the time of the resource response in the generation procedure of Slice 1.

When the RAN slice management unit 221 determines that the requested performance of Slice 2 is satisfied, the RAN slice management unit 221 transmits a radio resource request (Slice 2) to the radio resource management unit 222 (Step S402).

At this time, the requested guaranteed rate, peak rate and site are identical with those of the request from the orchestrator 24. The requested delay time is the delay time of the radio resource for which the total of the above-mentioned delay times is less than or equal to 500 ms.

The radio resource management unit 222 determines an assignable radio resource based on the radio resource request (Slice 2).

In this case, the requested peak rate is high and the requested delay time is long, and therefore a short TTI support is not required. Thus, a radio resource of Split Option 7-1 capable of MIMO is to be assigned at the Site 1.

When available radio resources satisfying those requests remain and it is determined that the requested performance is satisfied, the radio resource management unit 222 transmits physical or virtual radio resource requests (Slice 2) to the master station control unit 223 and the slave station control unit 224

(Step S403 and Step S404).

The master station control unit 223 and the slave station control unit 224 respectively reserve, based on the radio resource request (Slice 2), a radio resource satisfying the request from their available radio resources.

The master station control unit 223 and the slave station control unit 224 respectively transmit a radio resource response (Slice 2) to the radio resource management unit 222 (Step S405 and Step S406). These radio resource responses (Slice 2) include information on the available radio resources which have decreased due to the reservation.

When the radio resource management unit 222 receives these information, the radio resource management unit 222 transmits to the optical resource management unit 225 a radio resource information notification (Slice 2). This radio resource information notification (Slice 2) includes information on the presence or absence and the amount of optical resources, e.g. functional split (Split Option 7-1) in the master station 12 and the slave stations 13a and 13b (Step S407).

Further, the radio resource management unit 222 transmits to the base station resource management unit 227 a radio resource information notification (Slice 2). This radio resource information notification (Slice 2) includes information on the presence or absence and the amount of base station resources, e.g. whether the master station 12 uses both the 4G core interface and the 5G core interface (Step S408).

When the radio resource information notification (Slice 2) is received from the radio resource management unit 222, the optical resource management unit 225 and the base station resource management unit 227 respectively transmit back a radio resource information response (Slice 2) (Step S409 and Step S410).

When the radio resource management unit 222 receive those responses, the radio resource management unit 222 transmits back to the RAN slice management unit 221 a radio resource response (Slice 2). This radio resource response (Slice 2) includes abstracted information on the available radio resources which have decreased due to the reservation (Step S411).

Similarly, the RAN slice management unit 221 transmits an optical resource request (Slice 2) to the optical resource management unit 225 (Step S412).

The optical resource management unit 225 is notified by the radio resource information notification (Slice 2) that the radio data of Split Option 7-1 is transmitted and received between the OLT 14 and ONUs 15a and 15b of Slice 2.

Therefore, in order to perform a peak rate monitoring, the optical resource management unit 225 reserves an optical resource having a policing function of 6.4 Gbps, which is 16 times the IP data rate of 400 Mbps. The optical resource management unit 225 also reserves a queue (generally a best effort queue) to be shared with other slices because the delay time is long.

The optical resource management unit 225 transmits a physical or virtual optical resource request (Slice 2) to the optical communication device control unit 226 (Step S413).

The optical communication device control unit 226 reserves, based on the optical resource request, an optical resource satisfying the request from its available optical resources.

The optical communication device control unit 226 transmits back to the optical resource management unit 225 an optical resource response (Slice 2). This optical resource response (Slice 2) includes information on the available optical resources which have decreased due to the reservation (Step S414).

When the optical resource management unit 225 receive those responses, the optical resource management unit 225 transmits back to the RAN slice management unit 221 an optical resource response (Slice 2). This optical resource response includes the abstracted information on the available optical resources which have decreased due to the reservation (Step S415). If the requested condition for Slice 2 includes a guaranteed rate, an optical resource will be reserved.

Similarly, the RAN slice management unit 221 transmits a base station resource request (Slice 2) to the base station resource management unit 227 (Step S416).

The base station resource management unit 227 assigns a policing function of 400 Mbps in total for two ports and a shared queue resource to the router 17. This is because the peak rate request is 400 Mbps, the requested delay time is long, and due to the above-mentioned radio resource information notification (Slice 2), the master station 12 uses both the 4G core interface and the 5G core interface. Moreover, an optical resource of an authentication function is to be assigned to the server 16.

The base station resource management unit 227 transmits a physical or virtual base station resource request (Slice 2) to the base station device control unit 228 (Step S417).

The base station device control unit 228 reserves, based on the base station resource request, a base station resource satisfying the request from its available base station resources.

The base station device control unit 228 transmits back to the base station resource management unit 227 a base station network resource response (Slice 2). This base station network resource response (Slice 2) includes information on the available base station network resources which have decreased due to the reservation (Step S418).

When the base station resource management unit 227 receives this response, the base station resource management unit 227 transmits to the RAN slice management unit 221 a base station resource response (Slice 2). This base station resource response (Slice 2) includes abstracted information on the available base station resources which have decreased due to the reservation (Step S419).

When the RAN slice management unit 221 receives these responses, the RAN slice management unit 221 determines that a resource can be assigned to Slice 2.

The RAN slice management unit 221 transmits a radio resource assignment request (Slice 2) to the radio resource management unit 222 in order to actually assign the various reserved resources to the various devices included in the resource layer 10 (Step S420).

When the radio resource management unit 222 receives the radio resource assignment request, the radio resource management unit 222 transmits a master station control request (Slice 2) to the master station control unit 223 (Step S421).

The master station control unit 223 transmits a master station control command for assigning the reserved physical or virtual radio resource to Slice 2 (Step S422).

When the master station control unit 223 receives a master station control response from the master station 12 included in the resource layer 10 (Step S423), the master station control unit 223 transmits a master station control response (Slice 2) to the radio resource management unit 222 (Step S424).

Further, the radio resource management unit 222 transmits a slave station control request (Slice 2) to the slave station control unit 224 (Step S425).

The slave station control unit 224 transmits slave station control commands for assigning the reserved physical or virtual radio resources to Slice 2 (Step S426).

When the slave station control unit 224 receives slave station control responses from the slave stations 13a and 13b included in the resource layer 10 (Step S427), the slave station control unit 224 transmits a slave station control response (Slice 2) to the radio resource management unit 222 (Step S428).

When the radio resource management unit 222 receives those responses, the radio resource management unit 222 transmits a radio resource assignment response (Slice 2) to the RAN slice management unit 221 (Step S429).

Similarly, the RAN slice management unit 221 transmits an optical resource assignment request (Slice 2) to the optical resource management unit 225 (Step S430).

When the optical resource management unit 225 receives this request, the optical resource management unit 225 transmits an optical communication device control request (Slice 2) to the optical communication device control unit 226 (Step S431).

The optical communication device control unit 226 transmits optical communication device control commands for assigning the reserved physical or virtual optical resources to slice 2 (Step S432).

When the optical communication device control unit 226 receives responses from the OLT 14 and the ONUs 15a and 15b included in the resource layer 10 (Step S433), the optical communication device control unit 226 transmits an optical communication device control response (Slice 2) to the optical resource management unit 225 (Step S434).

When the optical resource management unit 225 receives this response, the optical resource management unit 225 transmits an optical resource assignment response (Slice 2) to the RAN slice management unit 221 (Step S435).

Similarly, the RAN slice management unit 221 transmits a base station resource assignment request (Slice 2) to the base station resource management unit 227 (Step S436).

When the base station resource management unit 227 receives this request, the base station resource management unit 227 transmits a base station device control request (Slice 2) to the base station device control unit 228 (Step S437).

The base station device control unit 228 transmits base station device control commands such that the reserved physical or virtual base station resources are to be assigned to Slice 2 (Step S438).

When the base station device control unit 228 receives responses from the server 16 and the router 17 included in the resource layer 10 (Step S439), the base station device control unit 228 transmits a base station device control response (Slice 2) to the base station resource management unit 227 (Step S440).

When the base station resource management unit 227 receives this response, the base station resource management unit 227 transmits a base station resource assignment response (Slice 2) to the RAN slice management unit 221 (Step S441).

When the RAN slice management unit 221 receives this response, the RAN slice management unit 221 notifies the orchestrator 24 that the resources have been assigned to Slice 2 (Step S442).

Through the procedure described above, the various devices included in the resource layer 10 can assign various resources to Slice 1 and Slice 2.

Figure 7:
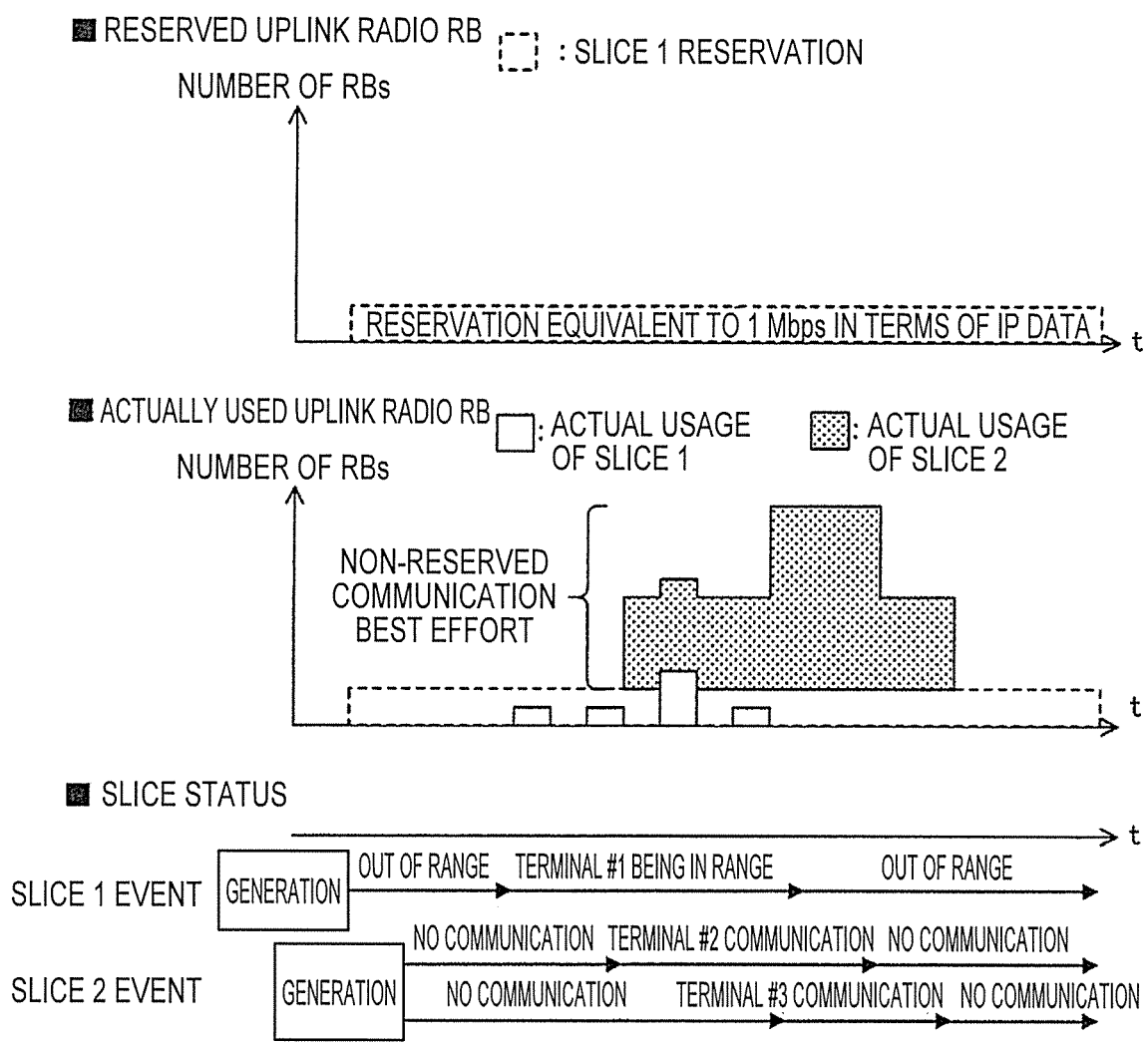
FIG. 7 shows an example of a reserved radio resource and an actually used radio resource at a site in the first embodiment of the present invention.

FIG. 7 shows an example of a reserved radio resource and an actually used radio resource at Site 1. In FIG. 7, there is shown a radio resource block, which is one radio resource.

The radio resource block reserved by the slave stations 13a and 13b is only a radio resource block equivalent to 1 Mbps, which is the guaranteed rate of Slice 1. For uplink data not guaranteed by Slice 1 and the uplink data of Slice 2, a shared radio resource block is used in accordance with the actual generation status of the uplink data of the terminal.

Figure 8:
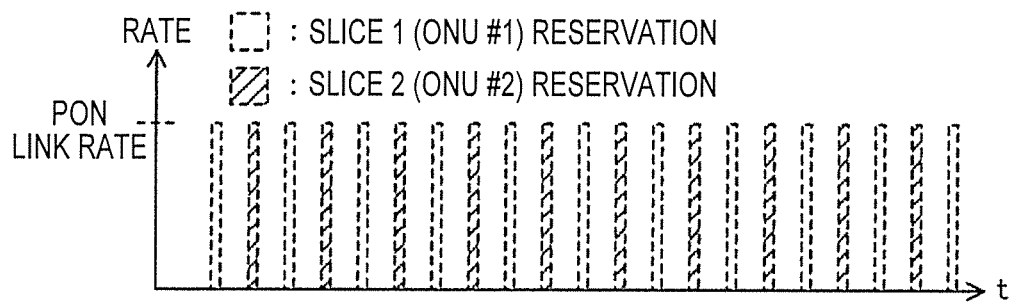
FIG. 8 shows an example of a reserved optical resource and an actually used optical resource in the first embodiment of the present invention.
Figure 8:
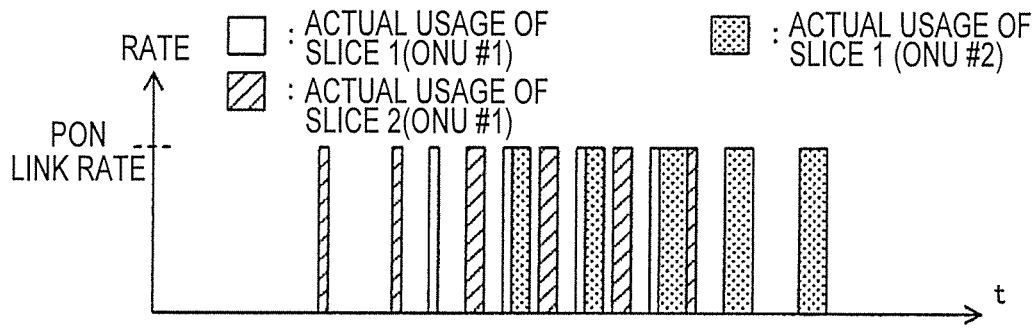
Figure 8:
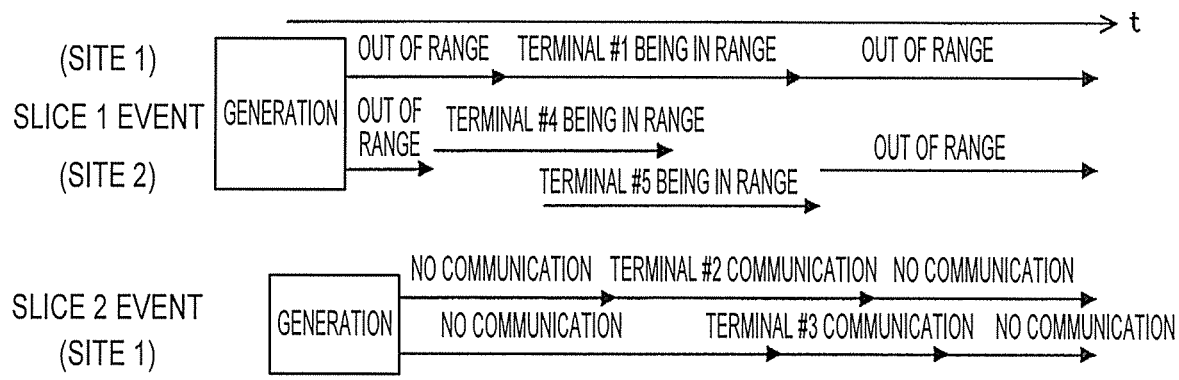

FIG. 8 shows an example of a reserved optical resource and an actually used optical resource. In FIG. 8, there is shown an uplink ONU transmission permission, which is one of the optical resources, to be assigned by the OLT 14.

At the timing when Slice 1 is generated, the OLT 14 reserves, for the ONUs 15a and 15b, an ONU transmission permission formed based on the uplink transmission time and the transmission length. This ONU transmission permission satisfies IP data transfer of 1 Mbps and the requested delay time.

For example, in a case where the requested delay time is 2 ms, in consideration of the transfer delay time of the ONUS 15a and 15b and the OLT 14 and an optical fiber propagation delay time, an ONU transmission permission for the ONUS 15a and 15b is assigned in a cycle equal to or less than a time determined by subtracting the total of those delay times. This is called a bandwidth-guaranteed ONU transmission permission.

Regarding an ONU transmission permission for uplink data not guaranteed by Slice 1 and the uplink data of Slice 2, an assignment control for adaptively changing a transmission length to be assigned to a shared non-reserved time is performed in accordance with the arrival status of the actual ONU uplink data.

Figure 9:
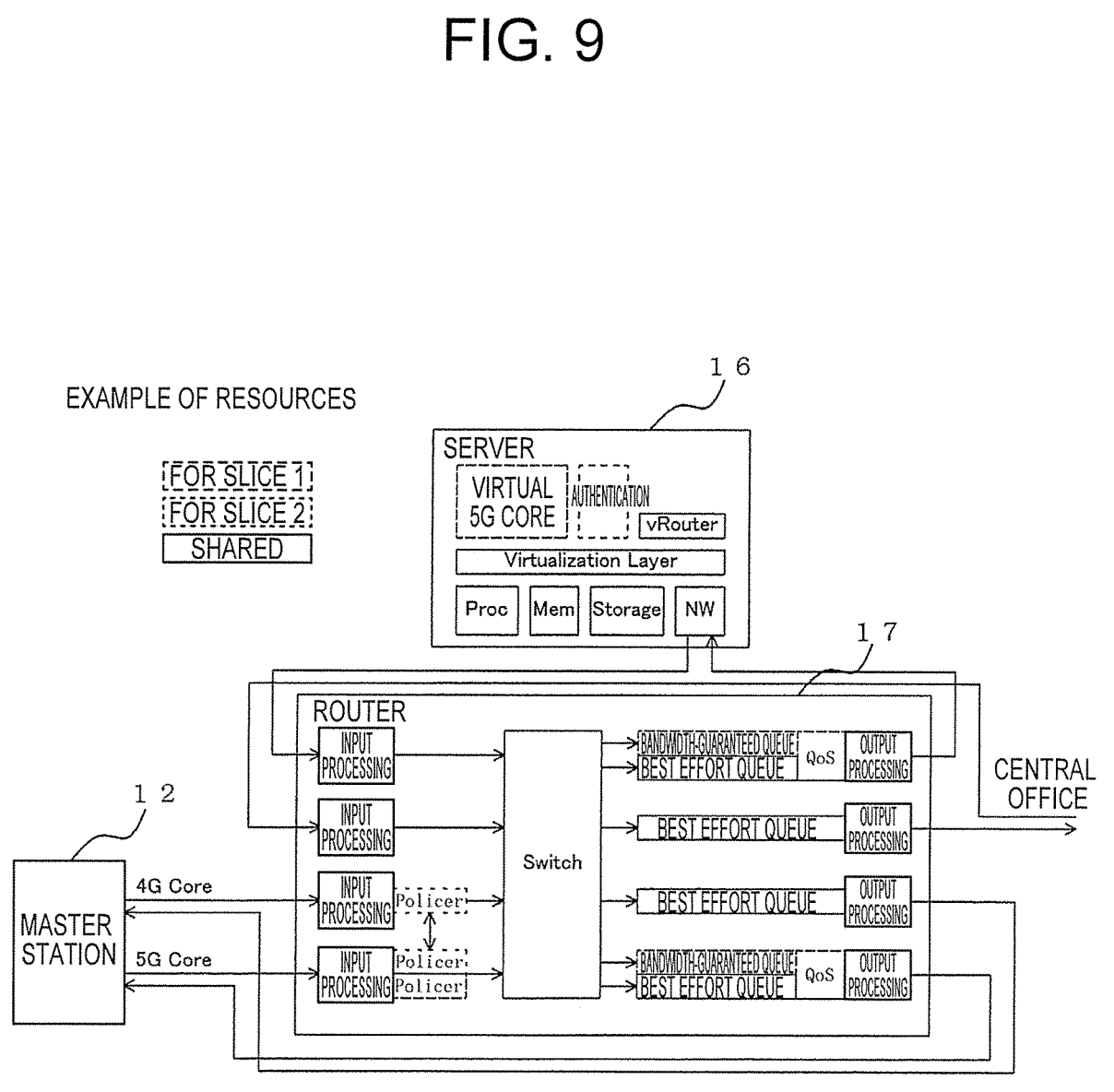

FIG. 9 illustrates an example of a reserved base station resource. In FIG. 9, the base station device control unit 228 of the RAN management device 22 causes the server 16 to implement a virtual 5G core function by preparing one or more virtual machines for Slice 1, and to also implement an authentication function by preparing one or more virtual machines for Slice 2 as well.

Regarding hardware resources of the processor, memory, storage and network, the amount of those resources required to ensure processing capability are set aside for Slice 1. Except for the resources required for installation of the virtual machines, it is not required to set aside such resources for Slice 2.

Similarly, the base station device control unit 228 causes the router 17 to prepare a bandwidth-guaranteed queue and a QoS function for Slice 1, and to prepare a policing function and a shared best effort queue for Slice 1 and Slice 2.

(Resource Extension)

Next, an operation performed in the RAN management device 22 according to the first embodiment of the present invention, when the communication system is extended after Slice 1 and Slice 2 are generated, is described with reference to FIG. 10 to FIG. 11.

Figure 10:
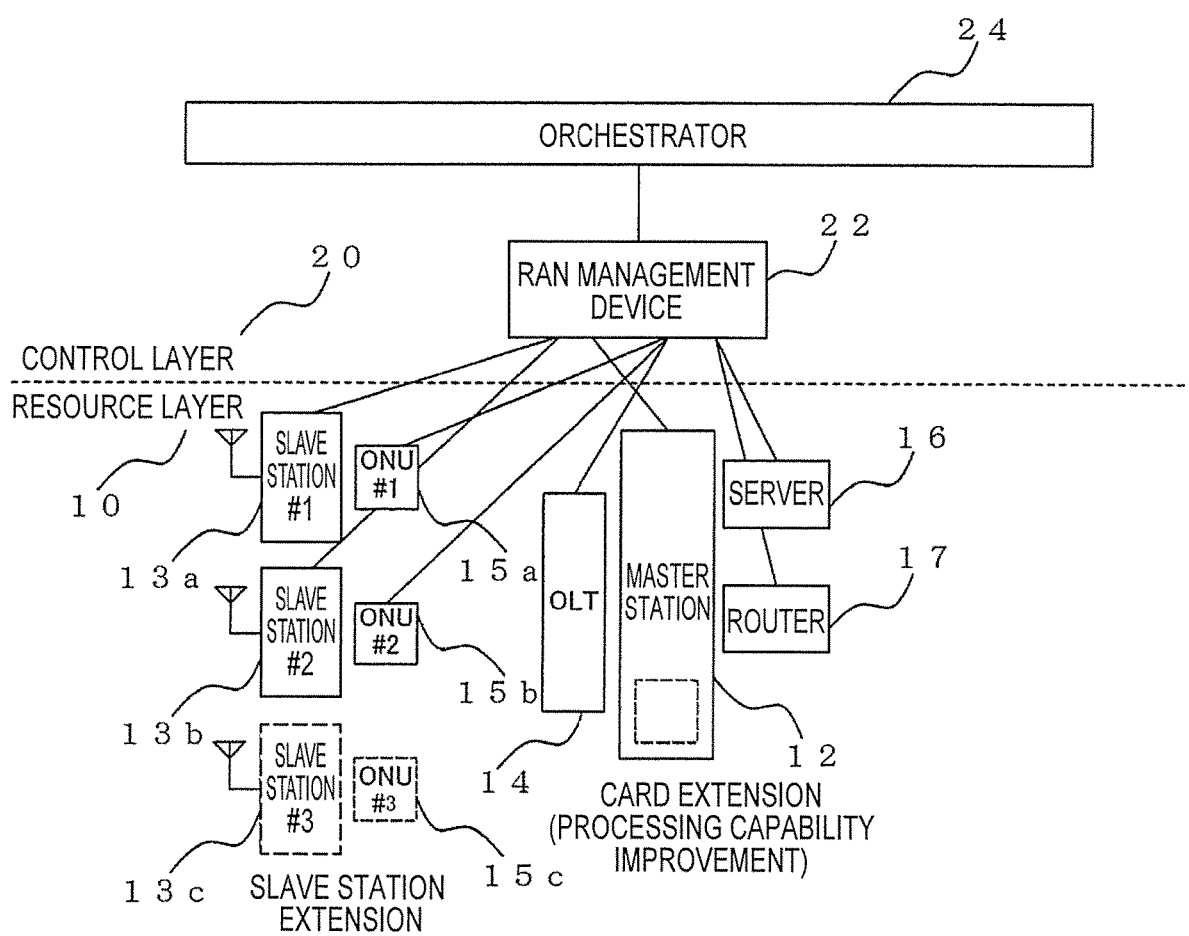
FIG. 10 illustrates an example of an extension of communication system in the first embodiment of the present invention.
Figure 11:
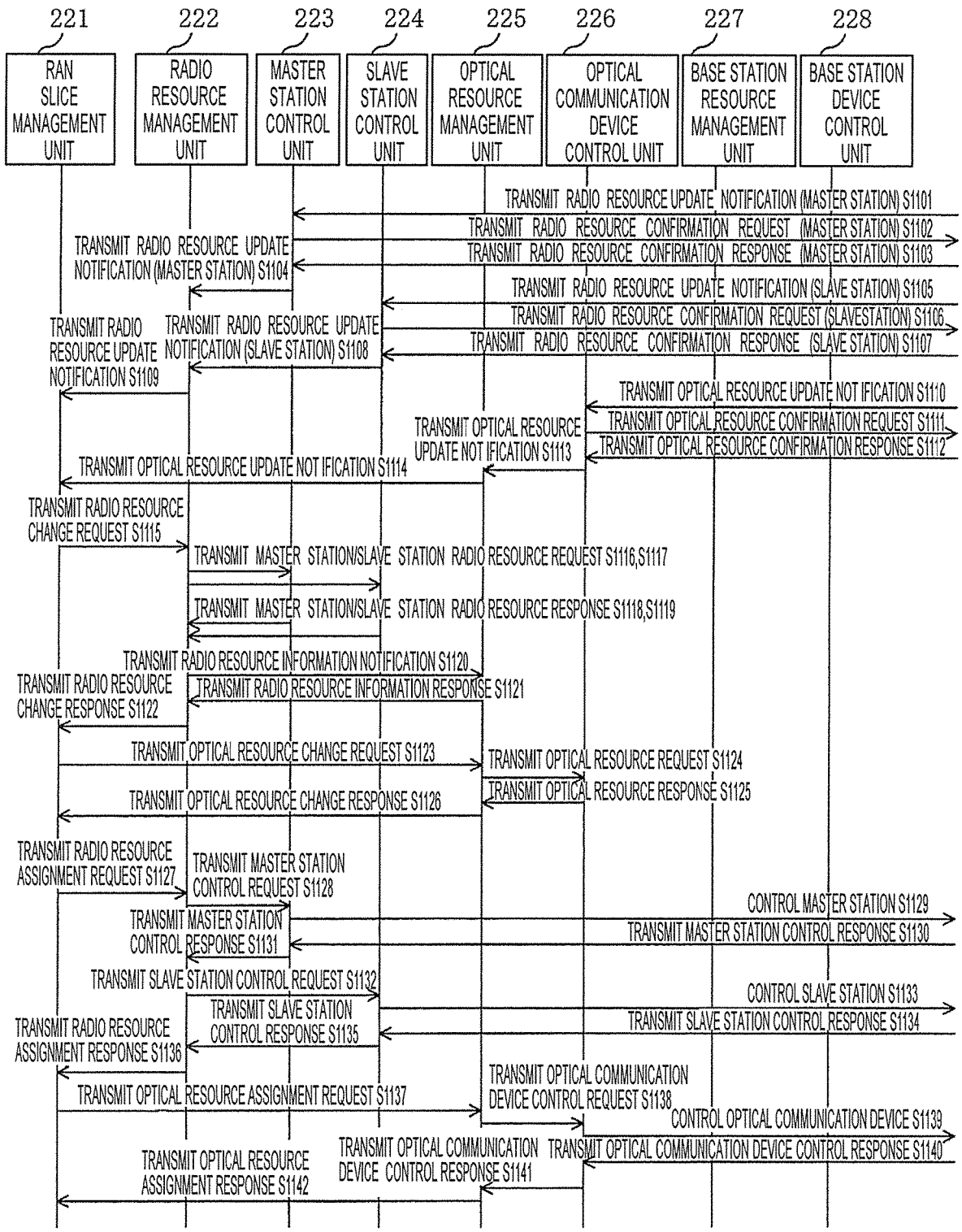
FIG. 11 illustrates an operation of the RAN management device at the time of an extension of communication system in the first embodiment of the present invention.

As illustrated in FIG. 10, a slave station 13c and an ONU 15c are extended at a Site 3. Further, a processing card of the master station 12 in the station building is extended.

Details of the operation of the RAN management device 22 are now described with reference to FIG. 11.

First, when the master station control unit 223 receives a radio resource update notification (Master Station) which notifies that the card of the master station 12 has been extended (Step S1101), the master station control unit 223 transmits a radio resource confirmation request (Master Station) to the master station 12 (Step S1102).

When the master station control unit 223 receives a radio resource confirmation response from the master station 12 (Step S1103), the master station control unit 223 transmits a radio resource update notification (Master Station) to the radio resource management unit 222 (Step S1104).

Further, when the slave station control unit 224 receives a radio resource update notification (Slave Station) which notifies that the slave station 13c has been extended (Step S1105), the slave station control unit 224 transmits a radio resource confirmation request (Slave Station) to the slave station 13c (Step S1106).

When the slave station control unit 224 receives a radio resource confirmation response from the slave station 13c (Step S1107), the slave station control unit 224 transmits a radio resource update notification (Slave Station) to the radio resource management unit 222 (Step S1108).

When the radio resource management unit 222 receives those two update notifications, the radio resource management unit 222 transmits to the RAN slice management unit 221 a radio resource update notification. This radio resource update notification abstracts and notifies that the card of the master station 12 has been extended and that the slave station 13c has been extended to the Site 3 (Step S1109).

Similarly, when the optical communication device control unit 226 receives an optical resource update notification which notifies that the ONU 15c has been extended (Step S1110), the optical communication device control unit 226 transmits an optical resource confirmation request to the ONU 15c (Step S1111).

When the optical communication device control unit 226 receives an optical resource confirmation response from the ONU 15c (Step S1112), the optical communication device control unit 226 transmits an optical resource update notification to the optical resource management unit 225 (Step S1113).

When the optical resource management unit 225 receives this update notification, the optical resource management unit 225 transmits to the RAN slice management unit 221 an optical resource update notification. This optical resource update notification abstracts and notifies that the ONU 15c has been extended to the Site 3 (Step S1114).

When the RAN slice management unit 221 receives the radio resource update notification and the optical resource update notification, the RAN slice management unit 221 evaluates the effect on existing slices. The RAN slice management unit 221 determines that there is an effect on Slice 1, which has a requested performance including all sites.

The RAN slice management unit 221 determines that the requested performance of Slice 1 is satisfied if the total of the delay time of the radio resource of the Site 3 (3 ms, which is identical with those of the other sites), the delay time of the optical resource of the Site 3 (1 ms) and the delay time of the base station resource (4 ms) is more than or equal to 10 ms which is the requested condition, and if there is an available resource satisfying the guaranteed rate of 1 Mbps even in the slave station 13c.

When it is determined that the requested performance of Slice 1 is satisfied, the RAN slice management unit 221 transmits a radio resource change request (Slice 1) to the radio resource management unit 222 (Step S1115). This radio resource change request (Slice 1) includes a request for the Site 3.

At this time, the requested guaranteed rate, peak rate and site are identical with those of the request from the orchestrator 24. The requested delay time is the delay time of the radio resource for which the total of the above-mentioned delay times is less than or equal to 10 ms.

The radio resource management unit 222 determines an assignable radio resource at the Site 3 based on the radio resource change request (Slice 1).

Similarly to the case described above, the slave station 13c is to be assigned a radio resource supporting Split Option 2 and a short TTI and guaranteeing 1 Mbps in terms of IP data at the Site 3. Moreover, the master station 12 is to be assigned a 5G function.

If available radio resources satisfying those requests remains and it is determined that the requested performance is satisfied, the radio resource management unit 222 transmits physical or virtual radio resource requests (Slice 1) to the master station control unit 223 and the slave station control unit 224 (Step S1116 and Step S1117).

The master station control unit 223 and the slave station control unit 224 respectively reserve, based on the radio resource request, a radio resource satisfying the request from their available radio resources.

The master station control unit 223 and the slave station control unit 224 respectively transmit a radio resource response (Slice 1) to the radio resource management unit 222 (Step S1118 and Step S1119). These radio resource responses (Slice 1) include information on the available radio resources which have decreased due to the reservation.

When the radio resource management unit 222 receives these notifications, the radio resource management unit 222 transmits to the optical resource management unit 225 a radio resource information notification (Slice 1). This radio resource information notification (Slice 1) includes information on the presence or absence and the amount of optical resources, e.g. functional split (Split Option 2) in the master station 12 and the slave stations 1a, 13b and 13c (Step S1120).

Since there is no particular change, the radio resource management unit 222 is not required to transmit a notification to the base station resource management unit 227.

When the radio resource information notification (Slice 1) is received from the radio resource management unit 222, the optical resource management unit 225 transmits back a radio resource information response (Slice 1) (Step S1121).

When the radio resource management unit 222 receives this response, the radio resource management unit 222 transmits back to the RAN slice management unit 221 a radio resource response (Slice 1). This radio resource response (Slice 1) includes abstracted information on the available radio resources which have decreased due to the reservation (Step S1122).

Similarly, the RAN slice management unit 221 transmits an optical resource request (Slice 1) to the optical resource management unit 225 (Step S1123).

The optical resource management unit 225 assigns an optical resource having a bandwidth-guaranteed QoS function, and particularly for an uplink, a bandwidth-guaranteed uplink ONU transmission permission function, at the Site 3.

As a result of the radio resource information notification (Slice 1), in consideration of the fact that Split Option is 2, the optical resource management unit 225 determines that the requests for an optical resource between the OLT and ONU of the Slice 1 are for 1 Mbps, which is equal to the guaranteed rate of 1 Mbps in terms of IP data.

Further, the optical resource management unit 225 assigns an optical resource having a policing function of 5 Mbps in total for the Site 1 to the Site 3 for a peak rate monitoring.

The optical resource management unit 225 transmits a physical or virtual optical resource request (slice 1) to the optical communication device control unit 226 (Step S1124).

The optical communication device control unit 226 reserves, based on the optical resource request, an optical resource satisfying the request from its available optical resources.

The optical communication device control unit 226 transmits back to the optical resource management unit 225 an optical resource response (Slice 1). This optical resource response (Slice 1) includes information on the available optical resources which have decreased due to the reservation (Step S1125).

When the optical resource management unit 225 receives this response, the optical resource management unit 225 transmits to the RAN slice management unit 221 an optical resource response (Slice 1). This optical resource response (Slice 1) includes the abstracted information on the available optical resources which have decreased due to the reservation (Step S1126).

When the RAN slice management unit 221 receives those responses, the RAN slice management unit 221 determines that a radio resource and an optical resource can be assigned to Slice 1 at the Site 3.

The RAN slice management unit 221 transmits a radio resource assignment request (Slice 1) to the radio resource management unit 222 in order to actually assign the various reserved resources to the various devices included in the resource layer 10 (Step S1127).

When the radio resource management unit 222 receives the radio resource assignment request, the RAN slice management unit 221 transmits a master station control request (Slice 1) to the master station control unit 223 (Step S1128).

The master station control unit 223 transmits a master station control command for assigning the reserved physical or virtual radio resource to Slice 1 (Step S1129).

When the master station control unit 223 receives a master station control response from the master station 12 included in the resource layer 10 (Step S1130), the master station control unit 223 transmits a master station control response (Slice 1) to the radio resource management unit 222 (Step S1131).

Further, the radio resource management unit 222 transmits a slave station control request (Slice 1) to the slave station control unit 224 (Step S1132).

The slave station control unit 224 transmits a slave station control command for assigning the reserved physical or virtual radio resource to Slice 1 (Step S1133).

When the slave station control unit 224 receives a slave station control responses from the slave station 13c included in the resource layer 10 (Step S1134), the slave station control unit 224 transmits a slave station control response (Slice 1) to the radio resource management unit 222 (Step S1135).

When the radio resource management unit 222 receives those responses, the radio resource management unit 222 transmits a radio resource assignment response (Slice 1) to the RAN slice management unit 221 (Step S1136).

Similarly, the RAN slice management unit 221 transmits an optical resource assignment request (Slice 1) to the optical resource management unit 225 (Step S1137).

When the optical resource management unit 225 receives this request, the optical resource management unit 225 transmits an optical communication device control request (Slice 1) to the optical communication device control unit 226 (Step S1138).

The optical communication device control unit 226 transmits optical communication device control commands for assigning the reserved physical or virtual optical resources to Slice 1 (Step S1139).

When the optical communication device control unit 226 receives responses from the OLT 14 and the ONUs 15a, 15b and 15c included in the resource layer 10 (Step S1140), the optical communication device control unit 226 transmits an optical communication device control response (Slice 1) to the optical resource management unit 225 (Step S1141).

When the optical resource management unit 225 receives this response, the optical resource management unit 225 transmits an optical resource assignment response (Slice 1) to the RAN slice management unit 221 (Step S1142).

When the RAN slice management unit 221 receives this response, the RAN slice management unit 221 notifies the orchestrator 24 that the resources have been assigned to Slice 1.

Through the procedure described above, when a physical or virtual resource has been extended, it is possible to change the resource to be assigned to a slice. Even when a physical or virtual resource has been reduced, the resource to be assigned to a slice can be changed by the same procedure.

As described above, the management device for managing the radio access network according to the first embodiment of the present invention comprises the RAN slice management unit configured to manage slices of the radio access network, the radio resource management unit configured to manage radio resources possessed by the radio base station included in the radio network, the optical resource management unit configured to manage optical resources possessed by the optical communication device included in the optical network and the base station resource management unit configured to manage base station resources possessed by the base station device included in the base station network.

When a slice generation request is received from a higher-level management device, the RAN slice management unit determines the radio resource, the optical resource and the base station resource to be assigned to a slice, based on the requested performance of the slice.

With the above-mentioned features, it is possible to efficiently assign and manage the various communication resources included in the radio access network.

Second Embodiment

Next, a RAN management device according to a second embodiment of the present invention is described with reference to FIG. 12 and FIG. 13.

Figure 12:
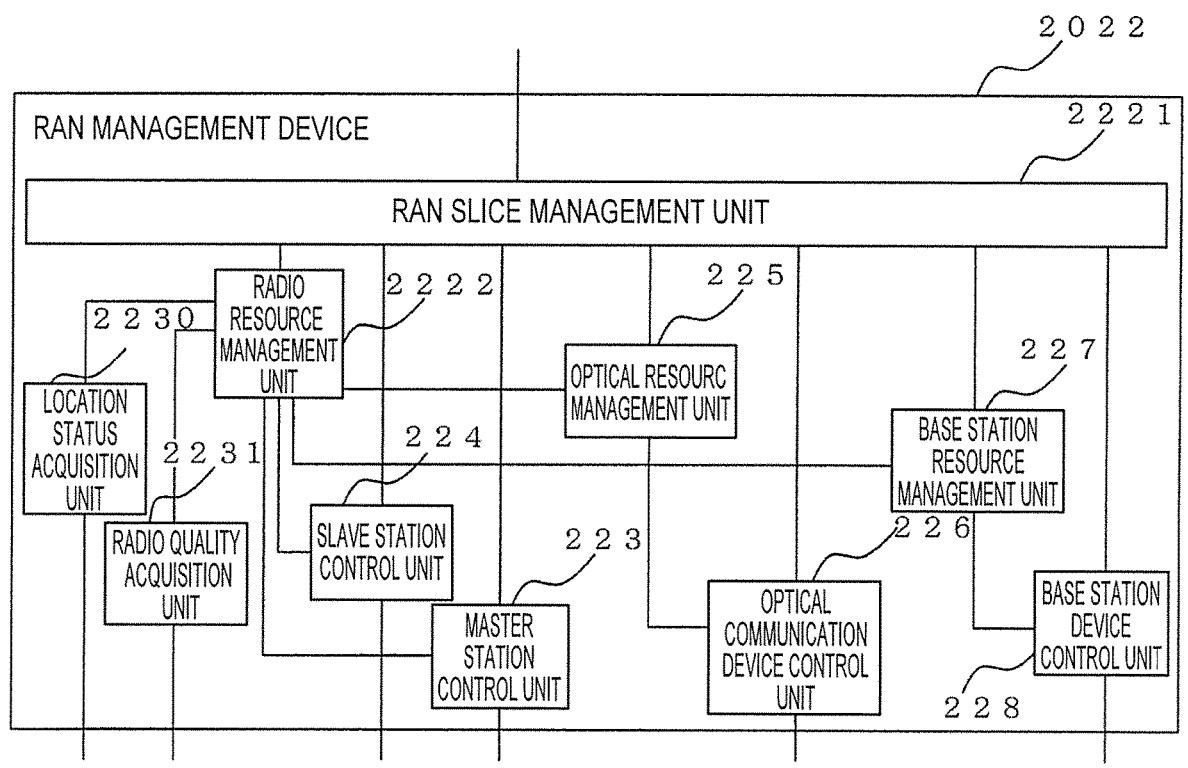
FIG. 12 is a function block diagram of a RAN management device according to a second embodiment of the present invention.

FIG. 12 is a function block diagram of a RAN management device 2022. The RAN management device 2022 comprises a RAN slice management unit 2221, a radio resource management unit 2222, the master station control unit 223, the slave station control unit 224, the optical resource management unit 225, the optical communication device control unit 226, the base station resource management unit 227, the base station device control unit 228, a location status acquisition unit 2230 and a radio quality acquisition unit 2231.

As to the RAN management device 2022, the procedure of acquiring available communication resources included in the resource layer 10, the procedure of generating Slice 1 and the procedure of generating Slice 2 are identical with those of the first embodiment.

(Changing Assignment of Resources)

Figure 13:
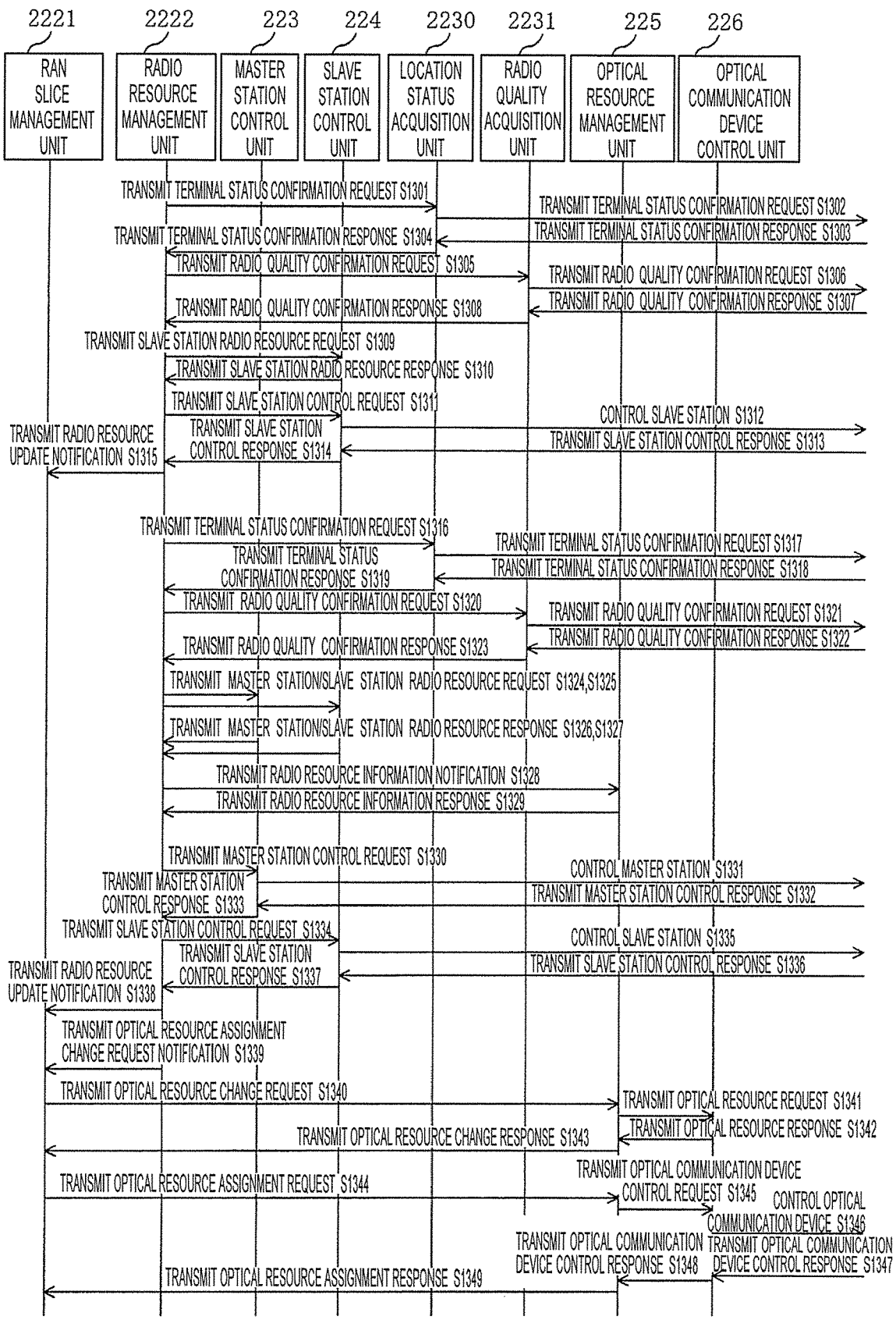
FIG. 13 illustrates an operation of the RAN management device at the time of movement of a wireless terminal in the second embodiment of the present invention.

FIG. 13 illustrates an example of an operation of changing an assignment of resources in the RAN management device 2022 according to the second embodiment of the present invention.

When a radio quality of the wireless terminal has changed after communication resources had been assigned to Slice 1 and Slice 2, the RAN management device 2022 changes the assignment of resources. Details of the operation of changing the assignment of resources by the RAN management device 2022 are now described with reference to FIG. 13.

Considering a case in which the radio quality of the wireless terminal 11a changes due to the wireless terminal 11a steadily moving from being in the range of the Site 1 to being out of the range.

The radio resource management unit 2222 periodically acquires a location status and a radio quality of each of the wireless terminals 11a to 11e by the following procedure. The acquisition period may be a short period, e.g. 1 minute, or the time interval maybe varied in accordance with the number of wireless terminals.

The radio resource management unit 2222 transmits a terminal status confirmation request to the location status acquisition unit 2230 in order to confirm the location status of each of the wireless terminals 11a to 11e (Step S1301).

The location status acquisition unit 2230 is configured to transmit a terminal status confirmation request to communication devices supporting a slice selection function, an RRC function, and the like, included in the resource layer 10. For example, the location status acquisition unit 2230 transmits a terminal status confirmation request to the master station 12 (Step S1302).

The location status acquisition unit 2230 receives a terminal status confirmation response (Step S1303). This terminal status confirmation response notifies that the wireless terminal 11a using Slice 1 at the Site 1 is in the range, the wireless terminals 11b and 11c using Slice 2 at the Site 2 are in the range, and the wireless terminals 11d and 11e using Slice 1 at the Site 2 are in the range.

The location status acquisition unit 2230 transmits back to the radio resource management unit 2222 a terminal status confirmation response including the received information (Step S1304).

Next, the radio resource management unit 2222 transmits a radio quality confirmation request to the radio quality acquisition unit 2231 in order to confirm the radio quality of each of the wireless terminals 11a to 11e (Step S1305).

The radio quality acquisition unit 2231 is configured to transmit a radio quality confirmation request to communication devices supporting an RRC function, an HARQ function, a channel estimation function, and the like, included in the resource layer 10. For example, the radio quality acquisition unit 2231 transmits a radio quality confirmation request to the master station 12 and the slave stations 13a and 13b respectively (Step S1306).

The radio quality acquisition unit 2231 receives radio quality confirmation responses (Step S1307). These radio quality confirmation responses notify that the radio quality of the wireless terminal 11a using Slice 1 has deteriorated and the retransmission control count is high, and that the radio qualities of the other wireless terminals 11b to 11e using Slice 1 and slice 2 are stable.

The radio quality acquisition unit 2231 transmits back to the radio resource management unit 2222 a radio quality confirmation response including the received information (Step S1308).

In place of asking to the various devices included in the resource layer 10, the location statuses and the radio qualities of the wireless terminals for each slice may also be obtained by asking to the terminal management device 21 illustrated in FIG. 1.

When the radio resource management unit 2222 receives the location statuses and the radio qualities of the wireless terminals 11a to 11e, the radio resource management unit 2222 evaluates whether these changes of statuses affect the slices.

In this case, the fact that the radio quality of the wireless terminal 11a for Slice 1 has deteriorated and the fact that Slice 1 is requesting a low delay and a guaranteed rate are considered. Moreover, the availability of the radio resources is also considered. The radio resource management unit 2222 makes the rate to be guaranteed even when the radio quality of the wireless terminal 11a has deteriorated.

For example, the modulation method and coding rate of the RBs of Slice 1 are changed to increase the number of RBs in terms of IP data. Further, if the slave station 13a and the wireless terminal 11a have a diversity function, the RBs of two component carriers may be assigned simultaneously for diversity.

Based on the determination described above, the radio resource management unit 2222 determines to change the physical or virtual radio resource of the slave station 13a.

The radio resource management unit 2222 transmits a radio resource request (Slice 1) to the slave station control unit 224 (Step S1309).

This request may notify only a request on the radio resource to be changed. Otherwise, if the slave station control unit 224 manages the radio resources of each slice, this request may notify a request on all the changed radio resources.

The slave station control unit 224 reserves, based on the radio resource request (Slice 1), a radio resource satisfying the request from its radio resources assigned to Slice 1 and its available radio resources.

The slave station control unit 224 transmits back to the radio resource management unit 2222 a radio resource response (Slice 1) including information on the available radio resources changed by the reservation (Step S1310).

The radio resource management unit 2222 determines that there is no effect on the optical resource, and does not notify information on the radio resource to the optical resource management unit 225.

The radio resource management unit 2222 transmits a slave station control request (Slice 1) to the slave station control unit 224 in order to assign the changed portion of the reserved physical or virtual radio resource to Slice 1 (Step S1311).

When the slave station control unit 224 receives this request, the slave station control unit 224 transmits a slave station control command. This slave station control command instructs the slave station 13a to assign the changed portion of the reserved physical or virtual radio resource to Slice 1 (Step S1312).

When the slave station control unit 224 receives a slave station control response from the slave station 13a (Step S1313), the slave station control unit 224 transmits a slave station control response (Slice 1) to the radio resource management unit 2222 (Step S1314).

When the radio resource management unit 2222 receives this response, the radio resource management unit 2222 transmits a radio resource update notification to the RAN slice management unit 2221 (Step S1315).

This notification includes abstracted information on the available radio resources decreased by the reservation.

Next, with reference to FIG. 13, further considering a case in which the wireless terminal 11a moves further and is located outside the range of the Site 1.

Similarly to the case described above, the radio resource management unit 2222 transmits a terminal status confirmation request to the location status acquisition unit 2230 in order to confirm the location status of each of the wireless terminals 11a to 11e (Step S1316).

The location status acquisition unit 2230 transmits a terminal status confirmation request to a communication device, e.g. the master station 12, supporting a slice selection function, an RRC function, and the like, included in the resource layer 10 (Step S1317).

The location status acquisition unit 2230 receives a terminal status confirmation response (Step S1318). This terminal status confirmation response notifies that the wireless terminal 11a using Slice 1 at the Site 1 is not in the range, the wireless terminals 11b and 11c using Slice 2 at the Site 2 are in the range, and the wireless terminals 11d and 11e using Slice 1 at the Site 2 are in the range.

The location status acquisition unit 2230 transmits back to the radio resource management unit 2222 a terminal status confirmation response including the received information (Step S1319).

Next, the radio resource management unit 2222 transmits a radio quality confirmation request to the radio quality acquisition unit 2231 in order to confirm the radio quality of each of the wireless terminals 11a to 11e (Step S1320).

The radio quality acquisition unit 2231 transmits a radio quality confirmation request to communication devices, e.g. the master station 12 and the slave stations 13a and 13b, supporting an RRC function, an HARQ function, a channel estimation function, and the like, included in the resource layer 10 (Step S1321).

The radio quality acquisition unit 2231 receives radio quality confirmation responses (Step S1322). These radio quality confirmation responses notify that the radio quality of the wireless terminals except for the wireless terminal 11a, i.e. the wireless terminals 11b to 11e using Slice 1 and Slice 2 are stable.

The radio quality acquisition unit 2231 transmits back to the radio resource management unit 2222 a radio quality confirmation response including the received information (Step S1323).

In place of asking to the various devices included in the resource layer 10, the location statuses and the radio qualities of the wireless terminals for each slice may also be obtained by asking to the terminal management device 21 illustrated in FIG. 1.

When the radio resource management unit 2222 receives the location statuses and the radio qualities of the wireless terminals 11a to 11e, the radio resource management unit 2222 evaluates whether the changes of statuses affects the slice.

In this case, all of the wireless terminals 11a to 11e are not in the range of the Site 1, and therefore it is determined that a guaranteed rate is not to be given to Slice 1 at the Site 1.

Based on this determination, the radio resource management unit 2222 determines to change the physical or virtual radio resources of the master station 12 and the slave station 13a and the physical or virtual optical resources of the other optical communication devices.

The radio resource management unit 2222 transmits a radio resource request (Slice 1) to the master station control unit 223 and the slave station control unit 224 respectively (Step S1324 and Step S1325).

The master station control unit 223 and the slave station control unit 224 reserve, based on each radio resource request (Slice 1), a radio resource satisfying the request from its radio resources assigned to Slice 1 and its available radio resources.

There is no particular change at the Site 2, and release of the radio resource previously assigned at the Site 1 is reserved.

The master station control unit 223 and the slave station control unit 224 respectively transmit back to the radio resource management unit 2222 a radio resource response (Slice 1) including information on the available radio resources changed by the reservation (Step S1326 and Step S1327).

When the radio resource management unit 2222 receive those responses, the radio resource management unit 2222 transmits to the optical resource management unit 225 a radio resource information notification (Slice 1) (Step S1328). This radio resource information notification (Slice 1) includes information that a guaranteed rate is not to be given to the Site 1 and information on the presence or absence and the amount of optical resources, e.g. functional split (Split Option 2) in the master station 12 and the slave stations 13a and 13b.

When the optical resource management unit 225 receives this notification, the optical resource management unit 225 transmits back a radio resource information response (Slice 1) to the radio resource management unit 2222 (Step S1329).

When the radio resource management unit 2222 receives this response, the radio resource management unit 2222 transmits a master station control request (Slice 1) to the master station control unit 223 in order to release the reserved physical or virtual radio resource from Slice 1 (Step S1330).

When the master station control unit 223 receives the request, the master station control unit 223 transmits a master station control command for instructing the master station 12 to release the reserved physical or virtual radio resource from Slice 1 (Step S1331).

When the master station control unit 223 receives a master station control response from the master station 12 (Step S1332), the master station control unit 223 transmits a master station control response (Slice 1) to the radio resource management unit 2222 (Step S1333).

Further, the radio resource management unit 2222 transmits a slave station control request (Slice 1) to the slave station control unit 224 in order to release the reserved physical or virtual radio resource from Slice 1 (Step S1334).

When the slave station control unit 224 receives this request, the slave station control unit 224 transmits a slave station control command for instructing the slave station 13*a* to release the reserved physical or virtual radio resource from Slice 1 (Step S1335).

When the slave station control unit 224 receives a master station control response from the slave station 13*a* (Step S1336), and the slave station control unit 224 transmits a slave station control response (Slice 1) to the radio resource management unit 2222 (Step S1337).

When the radio resource management unit 2222 receives those responses, the radio resource management unit 2222 transmits a radio resource update notification to the RAN slice management unit 2221 (Step S1338).

This notification includes abstracted information on the available radio resources increased by the release of resources.

Further, the radio resource management unit 2222 transmits to the RAN slice management unit 2221 a notification of a request for changing the assignment of the optical resource (Slice 1) notifying that a change of the optical resource assignment is required, i.e. a notification that a guaranteed rate is not to be given to the site 1 (Step S1339).

When the RAN slice management unit 2221 receives the notification of a request for changing the assignment of the optical resource (Slice 1), the RAN slice management unit 2221 transmits to the optical resource management unit 225 an optical resource change request (Slice 1) notifying that a guaranteed rate is not to be given to the site 1 (Step S1340).

When the optical resource management unit 225 receives this request, the optical resource management unit 225 transmits an optical resource request (Slice 1) to the optical communication device control unit 226 in order to release the bandwidth-guaranteed QoS function resource satisfying the guaranteed rate of 1 Mbps assigned to Slice 1 at the Site 1 (Step S1341).

The optical communication device control unit 226 reserves, based on the optical resource request (Slice 1), release of the bandwidth-guaranteed QoS function resource at the Site 1 of the OLT 14 and the ONU 15*a*.

The optical communication device control unit 226 transmits back to the optical resource management unit 225 an optical resource response (Slice 1) including information on the available optical resources which have decreased due to the reservation (Step S1342).

When the optical resource management unit 225 receives this response, the optical resource management unit 225 transmits back to the RAN slice management unit 2221 an optical resource change response (Slice 1) including abstracted information on the available optical resources which have decreased due to the reservation (Step S1343).

When the RAN slice management unit 2221 receives this response, the RAN slice management unit 2221 transmits an optical resource assignment request (Slice 1) to the optical resource management unit in order to actually release the reserved optical resource by the optical communication device in the resource layer 10 (Step S1344).

When the optical resource management unit 225 receives this request, the optical resource management unit 225 transmits an optical communication device control request (Slice 1) to the optical communication device control unit 226 (Step S1345).

The optical communication device control unit 226 transmits an optical communication device control command for releasing the reserved physical or virtual optical resource from Slice 1 (Step S1346).

When the optical communication device control unit 226 receives responses from the OLT 14 and the ONU 15*a* included in the resource layer 10 (Step S1347), the optical communication device control unit 226 transmits an optical communication device control response (Slice 1) to the optical resource management unit 225 (Step S1348).

When the optical resource management unit 225 receives this response, the optical resource management unit 225 transmits an optical resource assignment response (Slice 1) to the RAN slice management unit 221 (Step S1349).

The base station resource management unit 227 and the base station device control unit 228 are not involved in those operations. Therefore, those parts are not shown in FIG. 13.

However, for example, if there is no wireless terminal using a service of Slice 2 in the range, the base station resource management unit 227 and the base station device control unit 228 are also involved for releasing the base station resource assigned to Slice 2.

As described above, the RAN management device 2022 according to the second embodiment of the present invention comprises the location status acquisition unit 2230 configured to acquire the location statuses of the wireless terminals 11*a* to 11*e* and the radio quality acquisition unit 2231 configured to acquire the radio qualities of the wireless terminals 11*a* to 11*e*.

As a result, the optical resource and the base station resource can be released from a slice in accordance with the location status and the radio quality of the wireless terminal, and therefore optical access devices and base station devices can be used efficiently.

Further, required or nonrequired radio resources can be added or deleted appropriately in accordance with the location status and the radio quality of the wireless terminals 11*a* to 11*e*. As a result, an efficient assignment of radio resources can be achieved.

REFERENCE SIGNS LIST

22, 2022 RAN management device (management device for managing a radio access network), 221, 2221 RAN slice management unit, 222, 2222 radio resource management unit, 225 optical resource management unit, 227 base station resource management unit, 2230 location status acquisition unit, 2231 radio quality acquisition unit.

The invention claimed is:

1. A management device for managing a radio access network including a radio network, an optical network and a base station network, the management device comprising:
a processor to,
manage a slice of the radio access network;
abstract and manage a radio resource possessed by a radio base station included in the radio network;
abstract and manage an optical resource possessed by an optical communication device included in the optical network; and
abstract and manage a base station resource possessed by a base station device included in the base station network,
wherein when a slice generation request is received from a higher-level management device, the processor determines an abstracted radio resource, an abstracted optical resource and an abstracted base station resource to be assigned to a slice, based on requested performance of the slice, and notifies radio resource information to manage the optical resource and the base station resource.

2. The management device according to claim 1, wherein the processor compares the abstracted radio resource determined in the RAN slice managing step to be assigned to the slice with an available radio resource possessed by the radio base station, in order to determine whether the radio resource is assignable to the slice.

3. The management device according to claim 1, wherein the processor compares an optical resource obtained by transforming the abstracted optical resource determined by the RAN slice managing step to be assigned to the slice by use of the notified radio resource information with an available optical resource possessed by the optical communication device, in order to determine whether the optical resource is assignable to the slice.

4. The management device according to claim 1, wherein the processor compares a base station resource obtained by transforming the abstracted base station resource determined by the RAN slice managing step to be assigned to the slice by use of the radio resource information with an available base station resource possessed by the base station device, in order to determine whether the base station resource is assignable to the slice.

5. The management device according to claim 1, further comprising:
the processor to,
acquire a location status on a wireless terminal; and
acquire a radio quality of the wireless terminal,
wherein the processor determines whether to change abstracted resources assigned to the slice based on at least one of the location status and the radio quality.

* * * * *